United States Patent [19]

Magnaghi

[11] 4,225,800

[45] Sep. 30, 1980

[54] MEANS FOR HOLDING THE END TURNS OF ELECTRIC MOTOR STATOR WINDINGS

[75] Inventor: Adriano Magnaghi, Mozzate, Italy

[73] Assignee: Emerson Electric Co., St. Louis, Mo.

[21] Appl. No.: 949,626

[22] Filed: Oct. 10, 1978

[30] Foreign Application Priority Data

Nov. 23, 1977 [IT] Italy .............................. 29933 A/77

[51] Int. Cl.² .............................................. H02K 3/46
[52] U.S. Cl. ................................................. 310/260
[58] Field of Search ........................ 310/260, 270, 42

[56] References Cited

U.S. PATENT DOCUMENTS

| 3,002,119 | 9/1961 | Lindstrom | 310/260 |
| 3,407,321 | 10/1968 | Grad | 310/260 X |

FOREIGN PATENT DOCUMENTS

| 2352946 | 4/1975 | Fed. Rep. of Germany | 310/260 |
| 2415839 | 10/1975 | Fed. Rep. of Germany | 310/260 |
| 2555869 | 6/1977 | Fed. Rep. of Germany | 310/260 |

*Primary Examiner*—Mark O. Budd
*Attorney, Agent, or Firm*—Polster, Polster and Lucchesi

[57] ABSTRACT

Means for holding the end turns of the stator windings of an electric motor or the like in place comprising a first unitary molded plastic member adapted to be placed on the inside of the windings and having a plurality of arms or web members spaced there-around which are adapted to extend at least in part over a portion of the inner surface of the windings, around the ends of the windings, and over a portion of the outer surface of the windings. A retainer ring is forceably installed over the outside of the web members so as to draw the web members into firm engagement with the windings and to positively hold the windings secure. A method of securing the windings is also disclosed.

19 Claims, 6 Drawing Figures

MEANS FOR HOLDING THE END TURNS OF ELECTRIC MOTOR STATOR WINDINGS

BACKGROUND OF THE INVENTION

This invention relates to means for and a method of holding the end turns of the stator windings of an electric motor or other dynamoelectric machine, and more particularly relates to such a holder intended to replace the lacings conventionally used to hold the end turns of the stator windings of an electric motor.

Conventionally, after the stator windings of a motor have been formed, blocked, and inserted into the core of the motor, the end turns of the stator winding coils are laced with a suitable textile lacing or the like so as to hold the wires comprising the stator windings which extend endwise from the core of the stator assembly (i.e., the end turns) in a desired arrangement and position. These lacings prevent shifting of the wires of the coil and help maintain the end turns in a desired compact arrangement.

Heretofore, this lacing was either manually or automatically applied by a machine to the end turns of the windings, but whether applied manually or automatically, the requirement of having to lace or otherwise tie the end turns of the windings required considerable time during manufacture of the motor and thus was relatively costly. Also, in certain instances, the lacing did not sufficiently compact or settle the wires comprising the end turns of the windings.

SUMMARY OF THE INVENTION

Among the several objects and features of this invention may be noted the provision of means or a device for holding the end turns of the stator windings of an electric motor firmly in place which may be readily manually or automatically applied;

The provision of such end turn holding means which may be readily, securely, and simultaneously locked into place on all of the end turns of the windings;

The provision of such end turn holding means which is relatively inexpensive and which requires less labor to install as compared with conventional lacing thus enabling an electric motor manufacturer utilizing the means of this invention to manufacture electric motors at a lower cost;

The provision of a method of holding the end turns of the stator windings of an electric motor securely in position which may be readily implemented either by manual or automatic means; and The provision of such holding means which is reliable and safe in operation and which is low in cost.

Briefly, means of this invention holds the end turns of the stator windings of a dynamoelectric machine (e.g., a motor) in a desired position. Generally, the end turns of an electric motor or the like extend in generally circular fashion around the longitudinal center line of the motor when viewed from the end of the latter. The means of this invention comprises a holding member having an inner portion adapted to fit on an inner surface of each of the end turns of the windings, a plurality of web members extending from the inner portion and being adapted to be wrapped around the outer ends of the end turns and at least partially around the outer surfaces of the end turns, and a securement member adapted to fit over the web members on the outside of the web members and on the outside of the end turns for securely holding the web members against the end turns.

The method of this invention for simultaneously securing the end turns of a plurality of stator windings of a dynamoelectric machine follows. The end turns are generally arranged end-to-end in a circular path as viewed from the end of the stator and have an inner surface, an end surface, and an outer surface. The method of this invention involves fitting an inner member on the inner surface of the windings, the inner member having a plurality of flexible web members extending therefrom. The web members are then at least partially fitted on the inner, the end, and the outer surfaces of the windings. And, lastly, an outer member is fitted endwise onto the end turns of the windings so that the outer member bears against the outer surfaces of the web members thereby to force them inwardly into tight holding engagement with the end turns of the stator windings.

Other objects and features of this invention will be in part pointed out and in part apparent hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
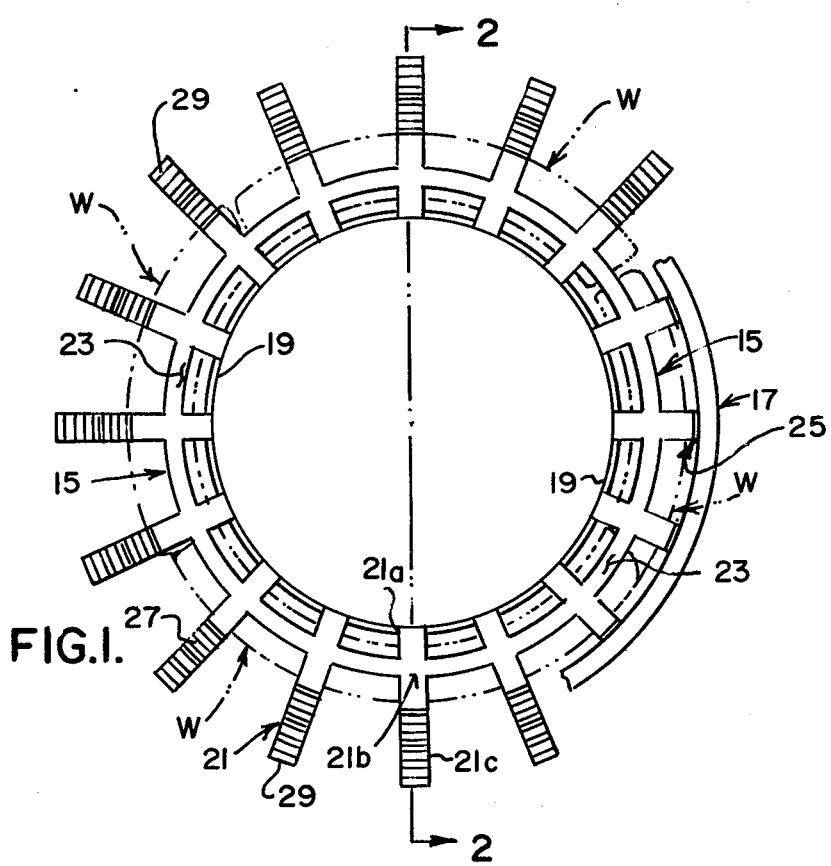
FIG. 1 is an end elevational view of a first or so-called cap member (also referred to as a holding member) of the end turn holding device of this invention with one portion of the cap member (the left portion) shown in its "as formed" position for being fitted onto the end turns (shown in phantom) of the stator windings and with another portion of the cap member (the right portion) being illustrated in its position as it is securely fitted on the end turns and held securely in place by a retaining ring fitted on the outside of the cap member and on the outside of the end turns.
Figure 4:
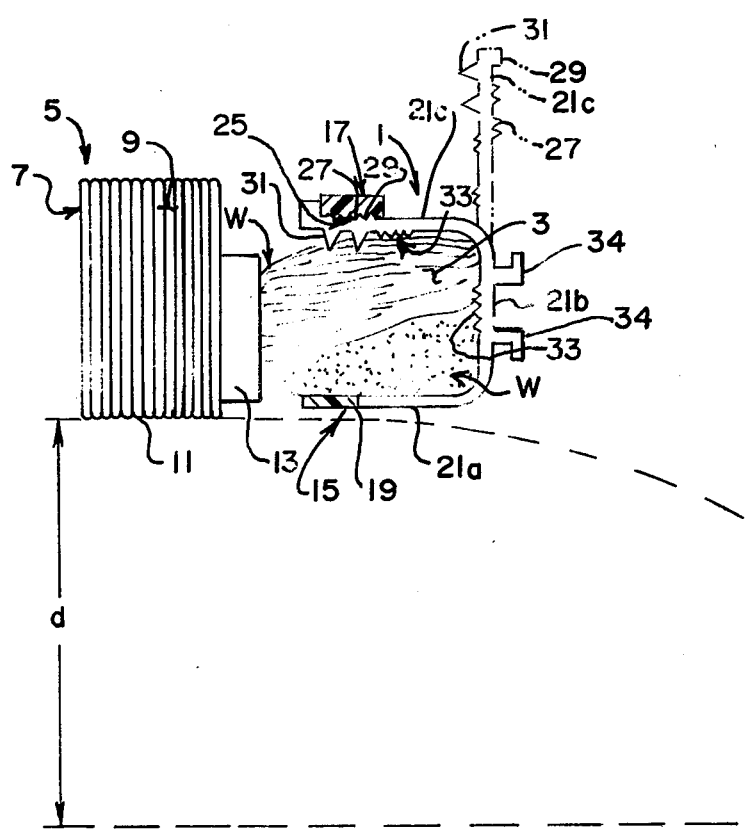
FIG. 4 is a longitudinal cross sectional view of the stator assembly of a conventional electric motor or other dynamoelectric machine illustrating a stator core, the end turns of a winding inserted in slots provided in the stator core and the method of this invention for installing the above-illustrated device.
Figure 3:
FIG. 3 is a cross sectional view of the retaining ring.

Referring now to the drawings and particularly to FIG. 4, a device (also referred to as means) of this invention is indicated in its entirety at 1. The device holds end turns 3 of stator windings W of a dynamoelectric machine (e.g., an electric motor) in a desired position or arrangement. Generally, an electric motor includes a stator assembly 5 having a core 7 comprises of a stack of lamination plates 9 made of suitable ferro-magnetic material. The lamination plates are so formed as to have an opening at their center and a plurality of notches extending radially outwardly from the center opening. When the laminations are assembled in the core stack, their center openings comprise a central bore 11 coaxial with a common central axis (i.e., the axis of the motor) and their notches forms slots (not shown) into which coils of wire are inserted so as to constitute windings W. As is conventional, coil insulation 13 may be placed in the slots between windings W and the lamination plates so as to electrically isolate the coils from the core. As best shown in FIG. 1, end turns 3 of windings W extend from the end faces of the stator core and are arranged generally in an end-to-end relation in a substantially circular path generally concentric with the central axis of bore 11. In describing the arrangement of the end turns as being in a generally circular path, it is to be understood that, in fact, the end turns may assume any number of different arrangements. For example, the end turns may not be curved along a circular path but rather may be like a chord of a circular path, or they may overlap (as shown in FIG. 4). The term "circular path" as herein used is intended to describe any arrangement of the end turns on which the device of this invention may be installed. As shown in FIG. 1, four end turns 3 of windings W are illustrated in phantom. It will be understood, however, that virtually any number of windings could be readily secured in accordance with this invention.

The device of this invention is shown in its preferred embodiment to include two basic components, namely, a first holding member 15 (also referred to as a so-called cap member) and a separate retainer ring 17. Cap member 15 is shown to be a unitary part preferably molded of suitable synthetic resin or plastic material (e.g., a suitable nylon resin). It includes a generally circular inner ring 19 having an outer diameter sized to fit snugly against the inner surfaces of end turns 3 of windings W (see FIG. 4) and an inner diameter approximately the dimension of (and preferably somewhat larger than) the diameter of bore 11 so as to be clear of the rotor (not shown) of the motor when the rotor is installed in stator assembly 5 in the usual manner. Cap member 15 further has a plurality of spoke-like members 21 which extend from inner ring 19. Each of these web members includes a first portion 21a adjacent inner ring 19 which, as shown in FIG. 4, extends in a direction generally parallel to the central axis of the cap member so as to be disposed adjacent the inner surfaces of windings W when the cap member is fitted endwise onto the windings in the manner as will be hereinafter explained. Further, each web member includes an intermediate portion 21b extending generally radially outwardly relative to the central axis of the cap member from the outer end of the first portion 21a for being disposed adjacent the outer end of end turns 3. Still further, the web members each include an outer portion 21c which, as shown in FIG. 1 and as shown in phantom in FIG. 4, normally extends radially outwardly from intermediate portion 21b when it is in its "as formed" position and which is adapted to be fitted around the outer surfaces of windings W. Alternatively, outer portion 21c may be formed to hook back on the first portion of the web member so that the web members are generally U shaped when viewed in side elevation. A so-called brace ring 23 is integrally formed or molded with cap member 15 so as to interconnect intermediate portions 21b of the web members. As previously mentioned, cap member 15 is formed of a suitable plastic material which is a good electrical insulator. It will be appreciated that web members 21 are so sized and structured as to be flexible so that they may be readily formed to the shape and dimensions of windings W.

Retainer ring 17 is so sized as to be adapted to fit snugly over the outside of windings W and over the outer portions 21c of web members 21 thereby to simultaneously firmly push the outer web member portions 21c into secure engagement with the outer surface of windings W and to pull the inner portions 21a and intermediate portions 21b of the web members taut into engagement with at least a portion of the inner surface of the windings and with the outer ends of the windings.

As generally indicated at 25, means is provided for locking or securing retainer rings 17 on the outer terminal portions 21c of web members 21 of the cap member when the retainer ring is installed on the cap member. This locking means is herein shown to comprise a series of spaced flanges 27 extending inwardly from the inner surface of ring 17 and a like series of spaced ribs 29 projecting outwardly from terminal portions 21c of web members 21 thus forming alternate detent grooves and ribs. These flanges and ribs are shown to interengage one another so that as the ring is pushed onto terminal portions 21c, the ribs and flanges will prevent or inhibit the removal of the ring from the cap member. Of course, it will be realized that other locking means could be provided. For example, only a single flange need be provided on ring 17 and only two spaced ribs to provide a detent groove therebetween need be on terminal portions 21c.

Figure 2:
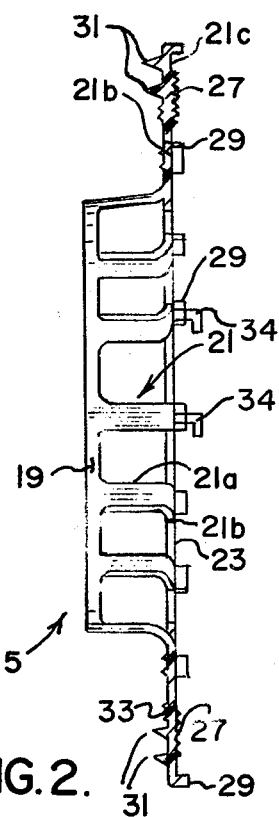
FIG. 2 is a view taken along line 2—2 of FIG. 1 illustrating the cap member in its "as formed" position prior to being fitted on the end turns.

As shown best in FIGS. 2 and 4, each terminal portion 21c may optionally have a stop 29 formed on its free end to engage ring 17 as it is moved to its installed position (FIG. 4) thereby to positively prevent the ring from slipping off the terminal portions.

Also, terminal portions 21c may be provided with one or more spikes 31 on their inner faces (as shown in FIG. 4) for being forced between the coil wires of windings W when the terminal portions are forceably pushed into engagement with the outer surfaces of the windings thereby to positively hold cap member 17 on the windings. Ribs 33 may be optionally provided on the inner surfaces of web members 21 so as to grip the windings.

As shown in FIG. 4, clips 34 may optionally be provided on cap 15 to provide a place to twist the leads to windings W and to support the lead wires connected to the windings after assembly of the motor. Clips 34 extend outwardly from ring 23 to allow the connection of the leads to be far enough from the end turns so that conventional insulating tape wrapped around the lead connections is unnecessry. Thus, the connection of the leads to the windings is made simpler and faster.

Figure 5:
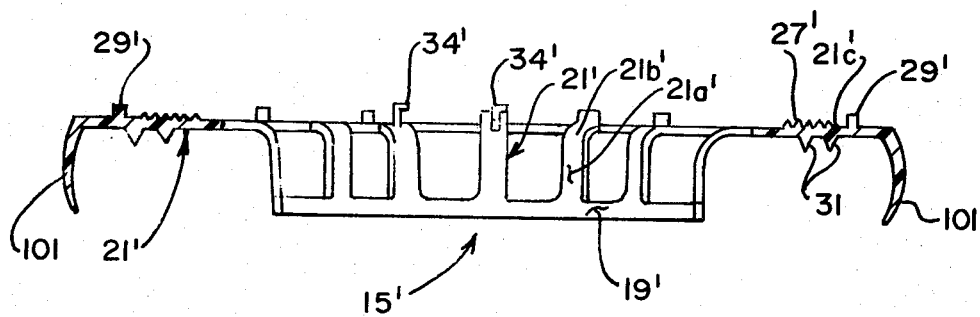
FIG. 5 is a cross sectional view similar to FIG. 2 of another embodiment of a cap member of this invention.
Figure 6:
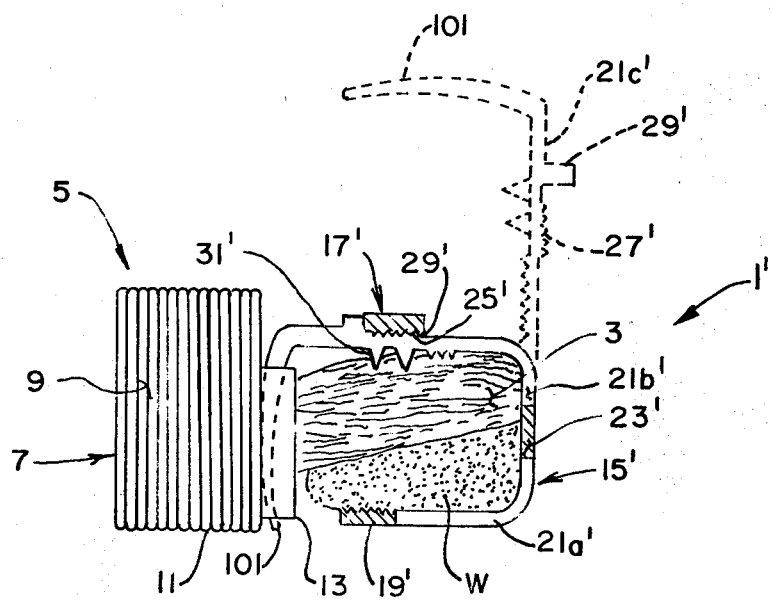
FIG. 6 is an enlarged view similar to FIG. 4 illustrating the other embodiment installed on the end turns of the motor.

Referring now to FIGS. 5 and 6, a second embodiment of the device of this invention is generally indicated at 1'. This second device is generally similar to device 1 heretofore described and the "primed" reference characters indicate parts of device 1' have a similar construction and function as corresponding parts in device 1.

As best shown in FIG. 5, the primary difference between device 1' and device 1 is the provision of a elongate hook-shaped tooth 101 which extends from the outer end of the outer portion 21C' of at least some of the web members 21'. As shown in FIG. 6, when cap member 15' is fitted on windings W, and when retainer ring 17' is fitted on the outside of web members 21', teeth 101 are forced inwardly toward core 9 and the outer ends of the teeth touch (or nearly touch) the outer face of the core so as to pick up any wires from windings W which may have become dislodged from end turns 3. As the web members are fitted into their final positions as shown in FIG. 6, it will be noted that teeth 101 extend through the openings in the end turns and hold or bundle any loose wires of the windings from contacting the end of core 9 holding the wires a desired distance from the core. Thus, web members 21' together with teeth 101 at least partially surround end turns 3. Of course, teeth 101 are preferably integrally cast with cap member 15 and are of a good electrical insulation material thereby to hold the wires of the windings clear of the core.

In accordance with the method of this invention for securing or holding end turns 3 of windings W of a stator assembly in place, device 1 of this invention may be readily and quickly installed either by hand (i.e., manually) or by a machine. The machine for carrying out the installation of device 1 is not shown in detail as it does not constitute a part of the present invention. However, details of the preferred method of installation of device 1, whether done manually or automatically, will hereinafter be disclosed.

With windings W inserted in core 7 in the conventional manner and with end turns 3 of the windings extending in end wise direction from one face of the core (as shown in FIG. 4), a tool, as indicated in dotted lines in FIG. 4 by reference character T, is applied to stator assembly so as to allow rapid installation of device 1. As shown, T tool has an ogive shape having a diameter d nearly identical to the diameter of bore 11. Cap member 15 is inserted onto the tool in its "as formed" position (see FIGS. 1 and 2) and is pushed axially endwise onto the windings. Tool T guides inner ring 19 of cap member 15 into position on the inner faces of the windings and intermediate portions 21b of web members 21 are firmly pushed against the outer ends of the windings. The tool allows for the rapid positioning of the inner ring of cap member 15 on the windings. Retainer 17 is then pushed in endwise direction onto the cap member so as to bend the terminal portions of web members 21 inwardly against the outer surfaces of windings W so as to implant spikes 31 between the coils of the wires of windings W. As the retainer ring is forced onto cap member 17 and windings W, the entire length of the web members are drawn taut on windings W and the wires of the windings are drawn or settled into a compact settlement and into a desired arrrangement. As ring 17 is pushed onto the cap member, the flanges and ribs 27 and 29 automatically lock thereby to prevent removal of the ring and to securely hold the ring in place on the cap member. Of course, device 1 acts as a stocking or lacing and securely holds the wires in their desired arrangement once installed.

Further in accordance with the method of this invention, as cap member 15 or 15' is firmly fitted on end turns 3 as described above, and as retainer ring 17, 17' is pushed over web members 21, 21' it will be understood that the compression placed on the end turns causes them at least in part to form and block the wires of the end turns into a desired configuration.

While devices 1 and 1' of this invention have heretofore been disclosed as utilizing a continuous retaining ring 17 or 17' for holding the outer ends of web members 21 or 21' in securement arrangement with the end turns, it will be understood that the retaining member could be constituted by a strap placed around the outsides of the web members and tightened so as to draw the web members into securement arrangement with the end turns.

In view of the above, it will be seen that the several objects of this invention are achieved and that other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. Means for holding end turns of the stator windings of a dynamoelectric machine in a desired position or arrangement, said end turns being arranged in a generally circular pattern around the longitudinal centerline of the dynamoelectric machine when viewed from the end of the latter, said means comprising a holding member having an inner portion adapted to fit on an inner surface of the end turns, a plurality of web members extending from said inner portion and being adapted to be wrapped around the outer ends of the end turns of the windings and at least partially around the outer surfaces of the windings, and a securement member separate from said holding member and adapted to fit over said web members on the outside of the web members and on the outside of the end turns of the windings for securely holding the web members against the end turns.

2. Means as set forth in claim 1 wherein said inner portion and said web members of said holding member are integral.

3. Means as set forth in claim 2 wherein said web members are flexible and are adapted to conform to the size and shape of the portions of the inner surface, the outer ends, and the outer surface of the end turns of the windings around which they are fitted.

4. Means as set forth in claim 3 wherein said holding member is made of a suitable synthetic resin material.

5. Means as set forth in claim 1 wherein said web members extend generally radially outwardly from said inner portion.

6. Means as set forth in claim 1 wherein said securement means is a ring having an inner diameter of such size that the ring fits snuggly on the outside of said web members thereby to hold the web members in secure holding relation on the end turns.

7. Means as set forth in claim 6 further comprising means on the outer surface of at least some of said web members and on the inner surface of said ring for interengagement between said last-mentioned web members and said ring thereby to secure said ring in position on said holding member.

8. Means for holding the end turns of the stator windings of a dynamoelectric machine in a desired position or arrangement, said end turns being arranged in a generally circular pattern around the longitudinal centerline of the dynamoelectric machine when viewed from the end of the latter, said means comprising a holding member having an inner portion adapted to fit on an inner surface of the end turns, a plurality of web members extending from the inner portion and being adapted to be wrapped around the outer ends of the end turns of the winding and at least partially around the outer surfaces of the windings, and a securement member adapted to fit over said web members on the outside of the web members and on the outside of the end turns of the windings for securely holding the web members against the end turns, said securement means being arranged having an inner diameter of such size that the ring fits snugly on the outside of said web members thereby to hold said web members in secure holding relation on said end turns, said means further comprising means on the outer surface of at least some of said web members and on the inner surface of said ring for interengagement between said last mentioned web members and said ring whereby to secure said ring on said holding member, said interengagement means comprising at least one inwardly protruding flange on the inner surface of said ring and at least two outwardly protruding, spaced ribs on the outer surface of some of said web members thereby to form a detent groove therebetween so that upon placing said ring on the outside of said web members, said flange and groove cooperate to hold said ring on said web members.

9. Means as set forth in claim 1 wherein at least some of said web members have means on their inner surfaces adapted to fit between the wires constituting the end turns of the windings when the web members are fitted thereon for holding the web members in position on the end turns.

10. Means as set forth in claim 9 wherein said holding means on said web members comprises one or more spikes on the inner surfaces of the web members adapted to fit between said wires.

11. Means as set forth in claim 1 wherein at least some of said web members have an outwardly projecting flange thereon, said flanges extending generally radially outwardly from said central axis when said web members are fitted around their respective end turns thereby to constitute a stop for said securement member.

12. Means as set forth in claim 1 wherein at least some of said web member have a tooth extending therefrom for encircling said end turns when said means is fitted on said windings.

13. A device for holding a plurality of end turns of the stator windings of a dynamoelectric machine, said end turns being arranged in what may be generally referred to as a circular pattern as viewed from the end of said machine, said device comprising a first member having an inner ring adapted to fit on the inner surfaces of said end turns, a plurality of web members integral with and extending from the inner ring, said web members being of a length sufficient to extend from said inner ring along a portion of the inner surface of said end turns, around the outer ends of said end turns, and around a portion of the outer surfaces of said end turns, and a retaining ring separate from said first member adapted to be fitted endwise onto said end turns and to bear against the outer surface of said web members thereby to securely hold the web members on the end turns and to securely hold the wires of said end turns in place.

14. A device as set forth in claim 13 wherein each of said web members has a first portion adjacent said inner ring extending therefrom in a direction generally parallel to the circular axis of the ring so as to be disposed on the inner surface of said end turns, an intermediate portion extending from said first portion in a direction generally radially outwardly with respect to said circular axis for being disposed on the outer end of the end turns, and an outer portion adapted to be held against the outer surface of said end turns.

15. A device as set forth in claim 14 further comprising a generally circular brace ring interconnecting said intermediate portions of adjacent web members.

16. A device as set forth in claim 13 wherein at least some of said web members have a tooth on their outer ends adapted to engage any wires of said windings which may have become dislodged from said end turns and to be disposed on the inside of said end turns so that said device substantially encircles said end turns thereby to hold said wires in place.

17. In an electric motor or other dynamoelectric apparatus having a stator assembly including a stator core comprising a stack of laminations, said core having a bore therethrough and a plurality of coils of wire constituting stator windings inserted in slots provided in said core with the ends of the coils, referred to as end turns, extending out beyond the faces of said stator core and being arranged in a substantially circular path, as viewed from the end of the stator core, generally concentric with said stator bore, wherein the improvement comprises:

means for holding said end turns comprising a holding member having an inner portion adapted to fit on the inner surfaces of said end turns, a plurality of web members extending from said inner portion so as to extend around at least in part a portion of the adjacent end turn, and a securement member adapted to fit over said web members and said end turns for securely holding said web members adjacent the outer surfaces of said end turns.

18. In an electric motor as set forth in claim 17 wherein said web members each have a hook-shaped tooth formed thereon for engaging wires of said windings or said web members are moved into holding engagement with said end turns, said web members and said teeth at least partially encircling said end turns for firmly holding said wires.

19. Means as set forth in claim 1 further comprising one or more posts or clips extending from said holding member, the wires comprising said windings being adapted to be secured to said posts for attachment of lead wires thereto.

* * * * *